Figure 1:
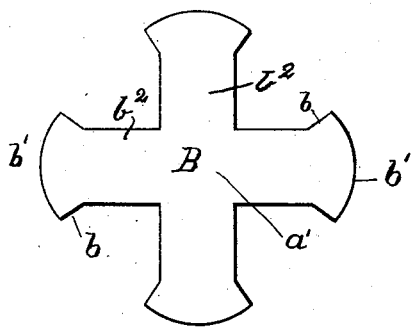

(No Model.)  
W. S. RICHARDSON.  
FASTENER FOR GLOVES, &c.

No. 605,833.  
Patented June 14, 1898.

2 Sheets—Sheet 1.

WITNESSES:  
F. H. Raymond 2d  
J. H. Dolan.

INVENTOR  
William S. Richardson

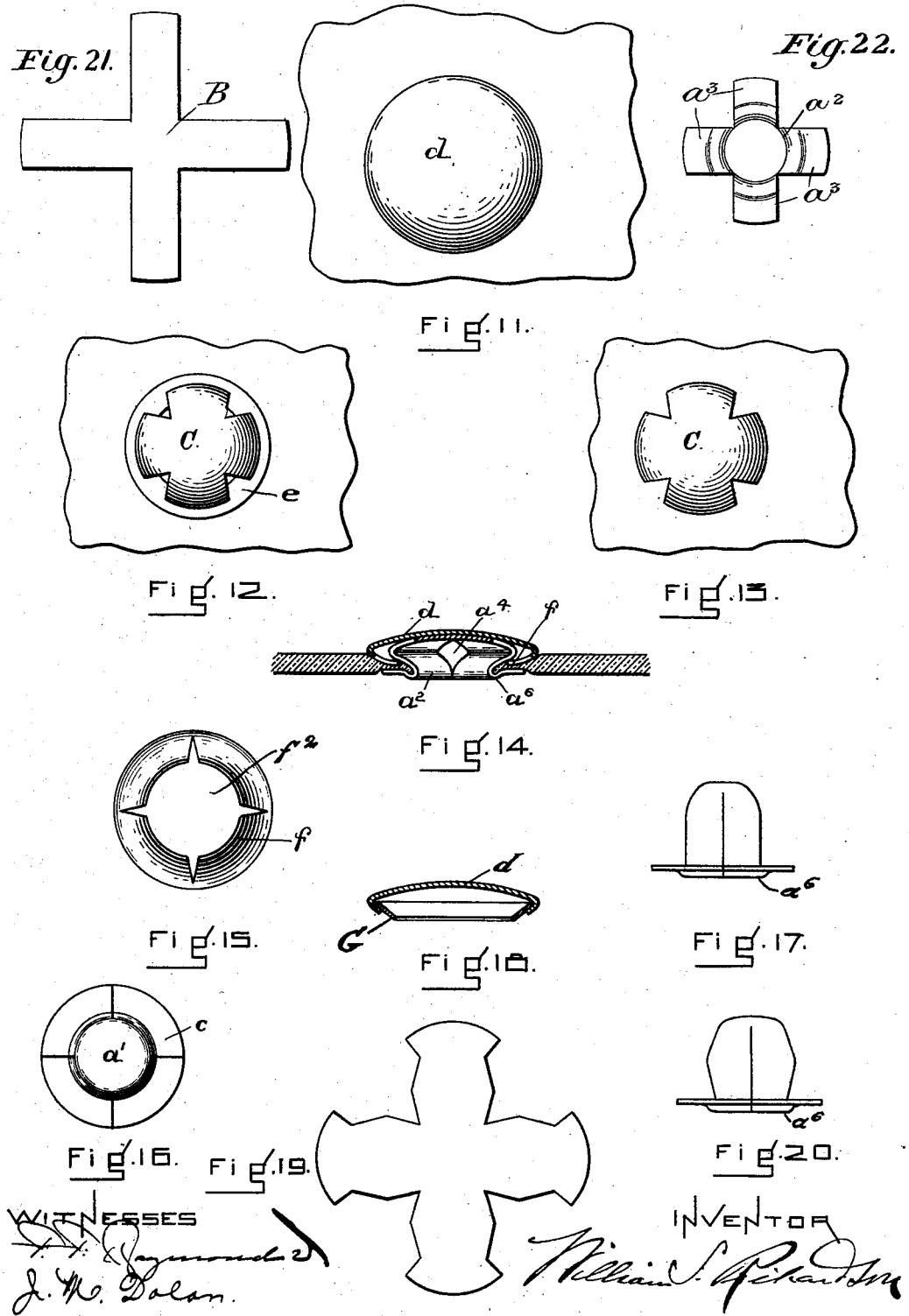

UNITED STATES PATENT OFFICE.

WILLIAM S. RICHARDSON, OF BOSTON, MASSACHUSETTS.

FASTENER FOR GLOVES, &c.

SPECIFICATION forming part of Letters Patent No. 605,833, dated June 14, 1898.

Application filed March 13, 1897. Serial No. 627,285. (No model.)

*To all whom it may concern:*

Be it known that I, WILLIAM S. RICHARDSON, a citizen of the United States, residing at Boston, in the county of Suffolk and State of Massachusetts, have invented a new and useful Improvement in Fasteners for Gloves and other Articles, of which the following is a full, clear, and exact description, reference being had to the accompanying drawings, forming a part of this specification, in explaining its nature.

The invention is an improvement upon the socket member of the type of fastener known as the "ball-and-socket" fastener and having a yielding socket-entrance upon one surface of the thing to which it is attached surrounded by a finishing-flange and a fastening-flange upon the opposite surface of said thing and a ball-holding cavity between; and its object is to provide in a socket member of this class integral means whereby it may be fastened to the glove or other article without the use of any additional parts or separate fastenings, so that upon providing the glove or other article with a hole and inserting the socket-piece within the hole the socket member is adapted to be immediately completed and attached by pressing the ends of the socket-piece together, and thereby converting it into a set socket member having its yielding socket-entrance upon one surface, a flange and closed top upon the other surface, and a ball-holding cavity between the socket-entrance and the top.

The invention thus comprises, first, the peculiar socket-piece so constructed as to be transformed in the act of setting into the socket member, and, second, the socket member. The socket-piece has a preformed sectional finishing-flange surrounding a yielding socket-entrance, which may be substantially in line with it or slightly below it, and a section practically cylindrical composed of separate sides or arms, which are integral with the sections of the finishing-flange, extend from their inner edge at the socket-entrance at practically a right angle to the flange, and are connected at their ends opposite the flange by an integral connection which closes the end and practically forms the top of the socket-piece. The portion of the socket-piece above the flange is of a nature and size to form in the act of setting the socket-piece a fastening-flange upon the surface of the glove or other article opposite that against which the preformed sectional flange bears, and which fastening-flange consists of outwardly-folded portions of the sides of the cylindrical section, which sides then extend from the connecting-top radially to form a portion of the top of the socket member and are then turned inward upon themselves to form the flange, the ball-holding cavity of the socket member, and to complete the socket-entrance. I thus provide what may be termed a "self-setting" socket-piece, which is transformed into a socket member and at the same time attached to the thing with or upon which it is used by any kind of pressure applied to its end, the socket-piece being of such a nature that the application of such pressure will immediately cause the upper fastening-flange to be formed from its sides, the socket-entrance to be completed by changing the inclination of the sides at the socket-entrance from a right to an acute angle, and a conical cavity within the socket-entrance established for the reception of the ball member of the fastener.

The invention further comprises the association of a socket member of this construction with a support or backing consisting of an outer ring or washer arranged to extend the bearing of the folded sides of the socket member and located between the folded sides and the surface of the material against which the folded sides would otherwise bear.

The invention also relates to means for providing the folded sides with auxiliary reinforcements, which may be yielding and which may be provided by yielding sections of the flange of the cap, as will hereinafter appear. The socket-piece is also of a length to provide, when formed into a socket member, a cavity of sufficient diameter and depth to receive and hold within the material and between the socket-entrance and the closed end of the socket member the part of the ball above its crease, or that section which is embraced by the edge of the socket member forming the socket-entrance. The ball-holding cavity is also substantially conical in shape—that is, the sides of the socket member extend outward from the socket-entrance to or near the edge of the flange, and the top of the socket member comprises what was the closed end of the socket-piece and the portions of the folded sides which extend to the outer edge of the flange. The socket-piece may also be set with an independent button-head or cap, and when so combined the extensions or enlargements developed in the act of setting are caused to extend upon a flange of the cap or button-head, and thereby fasten it to the socket-piece and to the material.

Figure 2:
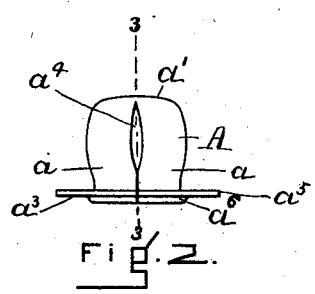
Figure 4:
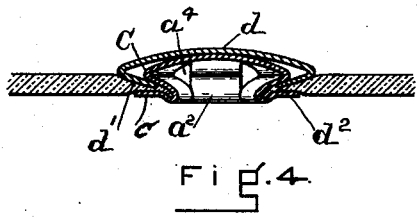
Figure 5:
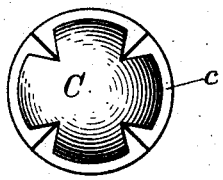
Figure 6:
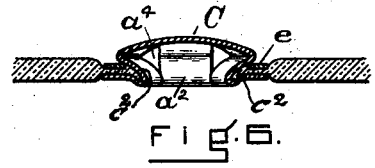
Figure 7:
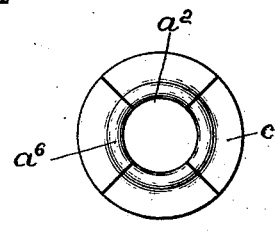
Figure 8:
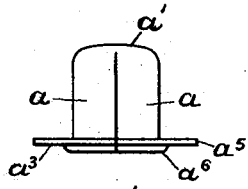
Figure 9:
Figure 10:
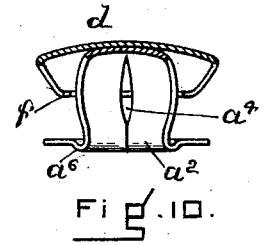
Figure 24:
Figure 23:
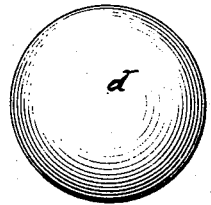

In the drawings, Figure 1 is a view in plan of a form of blank from which I prefer to make the socket-piece. Fig. 2 is a view in elevation, and Fig. 3 a view in vertical section upon the dotted line 3 3 of Fig. 2, of the socket-piece. Fig. 4 represents said socket-piece as set or secured to the material and combined with a button-head or cap. Fig. 5 is a view in plan of a socket-piece in its set condition, but not combined with the material. Fig. 6 is a view of a socket-piece set combined with the material and with a washer upon the outer surface of said material, the said washer serving as a flange, as an ornamental portion of the socket member, and also coöperating with the yielding parts of the socket-piece, as hereinafter specified. Fig. 7 is a view in plan of the socket-piece inverted, representing especially the finished flange thereof. Fig. 8 is a view in elevation of a modified form of socket-piece. Fig. 9 is a view in section, illustrating a socket-piece in its simplest form set upon the material. Fig. 10 is a view in vertical section of a socket-piece and a separate cap or button-head having a yielding flange which is combined with the socket-piece to reinforce its yielding sides and supplement their resiliency. Fig. 11 is a view in plan of the set socket and cap shown in Fig. 4. Fig. 12 is a view in plan of the set socket-piece and washer shown in Fig. 6. Fig. 13 is a view in plan of the set socket-piece shown in Fig. 9. Fig. 14 is a view in section, representing the cap having the yielding flange-section as set with the socket-piece. Fig. 15 is a view in plan inverted of the cap of Figs. 10 and 14 to show the way in which the flange is made yielding. Fig. 16 is a plan of the socket-piece represented in Figs. 2 and 3 before setting. Fig. 17 is a view in side elevation of a socket-piece having a top or end more rounded than that represented in Figs. 2 and 3. Fig. 18 is a view representing the cap having its flange extended by means of a collet. Fig. 19 represents a slight modification in the form of blank shown in Fig. 1, and Fig. 20 is a view of the socket-piece formed from the blank of Fig. 19. Fig. 21 is a view in plan of a blank for forming the socket-piece, the arms of which are not enlarged at their outer ends; and Fig. 22 is a view in plan of the flange end of a socket-piece formed from said blank. Fig. 23 is a view in plan of the cap, represented as forming a part of the socket member shown in Fig. 4; and Fig. 24 is a view in section of said cap.

The hole of the washer represented in Fig. 6 is in practice made larger in diameter than the diameter of that part of the socket member against it or in line with it when it is desired that the yielding or resilient action of the sides of the socket member shall not be restricted by the washer, but shall extend to a point or fulcrum above it.

The socket-piece A comprises a number of sections $a$, which form its sides and which are connected at one end by a connecting section or part $a'$, and which provide at their other end the yielding socket-entrance $a^2$ and the lateral extensions $a^3$, the side edges of which extensions preferably abut or nearly abut and preferably form a predetermined continuous and finished flange. I prefer that the sides $a$ be slightly bellied outward, as represented in Fig. 2, or that they have equivalent means for determining a line or place at which upon the application of pressure to both ends of the piece they shall fold outwardly.

I prefer to form the socket-piece from a blank of suitable material having the shape in plan represented in Fig. 1. This blank I have lettered B, and it is represented as having four arms $b^2$, extending radially and at equal distances one from the other. They are also represented as of the same width to their enlarged ends, each of which ends preferably having the inclined sides $b$ and the rounded outer edge $b'$. The blank is submitted to forming or shaping processes by which it is reduced or brought to the shape represented in Fig. 2—that is, the central section of the blank forms the end $a'$ of the socket-piece, and the radiating arms form the sides $a$, which are preferably curved in cross-section and which may have their edges abut throughout their length, as represented in Figs. 8 and 20, or may have them abut only at the socket-entrance and in the flange and may otherwise be separated from each other, as represented at $a^4$, Figs. 2 and 3, which causes the sides to bulge outwardly slightly. At any desired point in the flange between the socket-entrance and its outer edge $a^5$ is the downwardly-extending bead or projection $a^6$. This is preferably arranged immediately about the socket-entrance and not only forms a more or less ornamental finish to the flange, but also provides means, coöperating with a die, by which the sides of the socket-piece at the socket-entrance are prevented from opening or spreading outwardly during the setting of the socket-piece, which of course maintains the bore of the socket-entrance constant during the said setting operation, as will hereinafter be explained.

The "predetermined" flange $a^3$ is so called because it exists in the socket-piece in exactly the same manner that it exists in the socket member when it is attached to a glove or other article.

The term "cylindrically arranged," as applied to the arms, will be understood when it is considered that this socket-piece is substantially cylindrical in horizontal section, the walls of the cylinder being composed of the four arms which are formed and drawn into a shell, which while not always exactly cylindrical is substantially so.

To set the socket-piece, the material is first provided with a hole of suitable size at the spot where the socket member is to be attached to it, and the socket-piece is then mounted in a die, which is shaped or has means for determining the extent to which the socket-piece shall be shortened and extended and also with means for preserving or maintaining during the setting operation the diameter of the socket-entrance, the shape of the predetermined flange, and to prevent the spreading or opening of the entrance and flange. Another die is employed to exert pressure against the end of the socket-piece opposite the flange. The material is then placed with its hole in line with the socket-piece or about the socket-piece and one die moved toward the other, whereby end pressure is applied to the socket-piece and the part of the socket-piece above its predetermined flange and upon the side of the material opposite it is transformed from its cylindrical or partly-formed shape represented in Figs. 2, 3, 8, 10, and 20 to its finished or complete shape, the sides $a$ being by the action of the die bent or folded outwardly, completing the cap or end of the fastener, forming a fastening-flange upon the side of the material opposite the finished flange and establishing an enlargement within or beyond the socket-entrance of sufficient size to receive the ball member of the fastener and an accentuated socket-entrance having a rounded edge with arms extending preferably at an acute angle from the edge back to form the flange.

It will thus be seen that the socket member is formed and finished in the act of setting and will then have upon one surface of the material the flange $c$, composed of a number of arms, and an integral top or cover C, formed from the connecting-section $a'$ and the upper or inner parts of said arms $b^2$. It will also have the yielding sides, which are integral with the arms forming the flange and which form the rounded socket-entrance $a^2$. This is the socket member in its lowest or simplest terms. While a piece of the shape represented in Fig. 8—that is, of the same diameter throughout—may be set to the shape represented in Fig. 9 by end pressure, it is preferable, because of the greater pressure which it requires for setting a socket-piece of this shape, to previously shape the socket-piece so that a less end pressure will answer. This result is obtained, as above explained, by causing the sides to be bulged or extended outward at any desired point between the socket-entrance and the connecting end of the piece, and on the application of end pressure the fold will begin to develop upon the line of the greatest diameter of the piece. Any other means may be employed, however, which will weaken the sides along a predetermined line, whereby upon the application of end pressure the outward bend or fold is caused to be developed from such line.

The die which receives and holds the socket-piece preferably has a center pin of the size of the socket-entrance of the undeveloped socket-piece and of the depth of the cavity of the formed socket and a surrounding recess or cavity of a shape to receive the bead $a^6$ or, where the flange is flat throughout its extent, the outer edge of the flange. The socket-piece is in some instances combined with a button shell or cap. Such shell or cap is represented in Fig. 4. It has a top $d$, of any desired size and configuration and preferably continuous, and a divergent flange $d'$ upon its under side, which may extend inward to any desired extent and which surrounds an opening $d^2$ to the cavity inclosed by the flange and the top. The cap is secured to the socket-piece and to the material in the act of setting the socket-piece, the cap being placed upon the end $a'$ of the socket-piece after it has been placed between the separated dies, and upon the application of end pressure to the cap and socket-piece development of the socket-piece to the socket form causes the sections which are extended outwardly to lap upon the inner surface of the flange of the cap or shell and to thereby lock or fasten the cap or shell to the socket-piece and also to the material, the upper surface $a'$ of the socket-piece bearing against the top or inner surface of the cap. The parts thus secured together and to the material are represented in Figs. 4 and 14. The flange of the cap and the inclined sides of the socket member are thus brought into contact, and the flange may to some extent support or reinforce the said sides.

In Fig. 6 I have represented the socket-piece as combined with a washer $e$, placed upon the outer surface of the material, and the socket-piece in the act of setting is extended over the same and its sides may be brought into contact with the inner edge thereof. This causes the washer to, in effect, be a part of the upper or outer flange $c^2$ of the socket member, and it also enables the washer to support and reinforce the arms and to form a determining line from which the yielding sides $a^2$ of the socket member shall extend. The washer also affords a means for increasing or varying to some extent the ornamental appearance or finish of the exposed end of the socket-piece.

The opening in the washer may be large enough in some instances not to restrict the yielding action of the sides of the set socket-piece. In some instances a cap or shell for covering the exposed end of the socket member may be used which shall have its flange provided with formative and resilient properties in order that it may be closed against or upon the sides of the socket-piece in the act of setting and may afterward bear against said sides resiliently. The cap or shell having a flange of this character is represented in Figs. 10, 14, and 15, and the flange is provided with these formative and resilient properties by being slit in a number of places from its edge surrounding the cavity to the edge of the cap-top. In order that these yielding sections of the flange may adjust themselves radially to the sides of the socket-piece as the piece is being set, I prefer that the edge of the flange, being the part which first bears upon the material, be turned in flat or rounded, as represented in Figs. 10, 14, and 15 at $f$, and upon setting the socket-piece not only will the sides of the socket-piece be laterally developed to extend outward upon the inner surface of the split flange of the cap, but the sections of the split flange will be closed upon the extended sides of the socket-piece. (See Fig. 14.) The flange being thus shaped will bear uniformly against all sides of the socket-piece and being yielding will yieldingly support or reinforce the arms of the socket-piece against outward pressure. The lower edge of the divergent flange $f$ or that part about the opening $f^2$ should be sufficiently removed from the under surface of the cap-top as to bring the line of the fold of the sides of the socket-piece in the act of setting above the flange or between it and the cap-top.

In some cases the arms of the blank B may not be enlarged at their outer ends, and when such a blank is used the preformed flange of the socket-piece would not be continuous. (See Figs. 21 and 22.)

Figure 3:
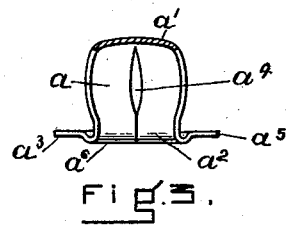

In Fig. 17 I have shown a socket-piece with a top or section connecting the side arms quite rounded instead of relatively flat, as represented in Figs. 2 and 3, and for some reasons it may be preferable to make the socket-piece with such a rounded top, as by its use I conceive that less pressure will be required for starting the folding action of the sides in the act of setting the piece.

In Fig. 18 the cap is represented as having a relatively-narrow integral flange, which, however, is extended and made wide by means of the separate collet G, upon which the flange of the cap laps. The cap with the collet is combined with the socket-piece in the same manner that the cap with the wide continuous flange is combined with it.

In Fig. 19 I have shown a form of blank varying slightly from the form of blank represented in Fig. 1 in that the arms have sides provided with opposing inclines, and a blank of this character will produce a socket-piece like that represented in Fig. 20. This socket-piece will have a bulging side like that of Figs. 2 and 3, but varies from them in that the edges of the sides bear against each other throughout the length of the socket-piece before it is set.

The advantages of the invention arise from the relative simplicity and cheapness of the socket member combined with its peculiar shape and properties, whereby there is resident in it a predetermined flange which finishes the inner or one surface of the material to which it is applied and a complete top or cover, upper flange, and spring sides which finish the other side of the material to which it is applied and without the use or intervention of any other part, the socket member being complete in and of itself and being set or formed to provide a fastening-flange and a cap or cover and a finished socket-entrance in the act of setting it or attaching it to the material upon which it is used. Another advantage arises from the fact that it may be used for attaching an independent or separate cap or button-head in one piece, so that the complete socket member has but the two parts, the independent cap and the socket member having upon one side of the material the finished flange and socket-entrance and upon the other side a fastening-flange which is formed by shortening the socket-piece and extending its diameter, and which flange is combined with the single-piece cap or button-shell in the act of setting it.

It will be observed that the socket-piece also provides a structure whereby the extent or degree of the resiliency of the socket-entrance and the width of the upper fastening-flange may be varied. This result is obtained by a socket-piece having a relatively long hollow tubular extension developing in setting with material of a given thickness a wider flange and a socket-entrance of greater resiliency than a socket-piece in which the tubular extension is shorter, metal of the same thickness and character of course being used in both pieces. Therefore to vary the width of flange the height of the tubular section above the preformed flange is shortened or lengthened, according to the result which it is wished to obtain, and to vary the resiliency of the socket-entrance the same variation is taken into account. This provision for variation in flange and resiliency is very desirable and effective for certain classes of work. For instance, thin weak fabrics as a rule require a wider flange and greater resiliency of socket-entrance than thicker and stronger fabrics. The greater resiliency is obtained because the length of the arms forming the socket-entrance and yielding sides is increased and the fulcrum of these arms removed farther from the point or line of resistance.

Having thus fully described my invention, I claim and desire to secure by Letters Patent of the United States—

1. As an improved article of manufacture, a socket-piece from which a complete socket member of a ball-and-socket fastener is formed in the act of securing said piece to the glove or other article on or with which said member is used, having a preformed separable flange surrounding a yielding socket-entrance, a top section, separate, foldable, resilient sides substantially parallel with each other, integral with the top section and preformed flange, which sides are adapted in the act of setting the piece to be separated in relation to each other, folded outwardly to form a fastening-flange, provide a ball-holding cavity within the material between the flanges, complete the socket-entrance and impart resiliency thereto.

2. A socket-piece from which a complete socket member of a ball-and-socket fastener is formed in the act of securing said piece to the glove or other article on or with which said member is used, having a preformed separable flange surrounding a yielding socket-entrance, the side edges of which flange abut when in their normal relation to each other, a top section, separable, foldable, resilient sides substantially parallel with each other integral with the top section and preformed flange, as and for the purposes set forth.

3. A socket-piece from which a complete socket member of a ball-and-socket fastener is formed in the act of securing said socket-piece to the glove or other article on or with which the member is used, having a preformed separable flange surrounding a yielding socket-entrance, a top section, separate, foldable, resilient sides integral with the top section and preformed flange, and shaped to slightly bulge outward, as and for the purposes set forth.

4. A socket-piece from which a complete socket member of a ball-and-socket fastener is formed in the act of setting said piece to the glove or other article on or with which the member is used, having a preformed separable flange surrounding a yielding socket-entrance, a top section, separate, foldable, resilient sides integral with the top section and preformed flange, and an outwardly-rounded bead or corrugation in the flange about the socket-entrance, all as and for the purposes set forth.

5. A socket member of a ball-and-socket fastener made from one piece of metal and having a top, separate arms or sections extending from said top outwardly and then back upon themselves, providing a sectional fastening-flange upon one surface of the glove or other article to which the member is secured, the said arms or sections extending through a hole in the said glove or other article at the lower edge of which hole they assemble and form a yielding socket-entrance, and from which socket-entrance they extend radially and make a fastening-flange upon the surface of the material opposite that upon which the said sectional fastening-flange bears, and which coöperates with the sectional folded flange in the fastening of the socket member.

6. The combination of a cap having an inwardly-extending flange upon its under side forming a cavity, and a socket member having a top and resilient folded sides within said cavity, and which folded sides lap upon the inner surface of the flange and sections of which sides extend from said flange toward each other and provide a ball-receiving space or cavity.

7. A socket member of a ball-and-socket fastener having a preformed separable flange surrounding a yielding socket-entrance upon one surface of the glove or other article to which the socket member is secured, a top section, and folded resilient arms extending from said top section outwardly and inwardly and through a hole in said glove, the said arms being integral with the top section and preformed flange and forming a fastening-flange upon the surface of said glove opposite that against which the preformed flange bears, yielding sides and a ball-holding cavity.

8. The combination, in a fastener, of a cap having a flange extending inwardly from its outer edge, with a socket member formed from a socket-piece having a preformed separable flange surrounding a yielding socket-entrance, a top section, separate, foldable, resilient sides integral with the top section and preformed flange, and which cap-section is combined with said socket-piece in the act of attaching it to a glove or other article by outwardly-extended folds of the said resilient sides within the cavity of the cap and upon the surface of the glove opposite that against which the preformed flange bears.

9. The combination of a socket member of a ball-and-socket fastener made from one piece of metal and having a top, separate arms or sections providing a sectional flange upon one surface of the glove and a yielding socket-entrance and a finishing-flange upon the other surface of the glove, and a support or backing upon which said first-named sectional fastening-flange bears, and having a hole through which the said arms extend, and which washer is of a size not to restrict or impede the yielding action of said arms.

10. The socket member above described, consisting of a socket-piece comprising the angular arms extending outwardly from a connecting portion and returning upon themselves to form an upper-flange and a socket-entrance, each arm being farther extended outwardly at its extremity to form a finishing-flange, between which and said upper flange the material is to be held, with a part having yielding reinforcing-arms located immediately below said upper flange and held in contact with the yielding arms of the socket-piece and adapted to lie on the opposite side of said material from said finished flange, as and for the purposes set forth.

11. A socket member comprising a set socket-piece having when set yielding sides, an upper and a lower flange, said upper flange being formed by the upset sections of said yielding sides and said lower flange by extensions thereof, a cap adapted to inclose said upper flange, and yielding sections upon said cap which reinforce said yielding sides, as and for the purposes set forth.

12. In a socket member of a ball-and-socket fastener, a cap having a divergent flange, combined with a socket member having a top section and separate resilient sides folded down or extended laterally against said divergent flange within said cap, said folded sides when thus extended laterally within said cap serving to retain the latter in place, and said divergent flange when pressed against the material being flattened against the said folded sides and serving to form an extended fastening-flange upon the upper side of said material.

13. A socket-piece having sectional sides, a socket-entrance, a predetermined sectional flange surrounding the socket-entrance, and means such as a rib or bead in or upon said flange adapted to coöperate with a holding or setting die having an opposing rib or shoulder to maintain the predetermined shape of the flange and the bore of the socket during the setting of the socket-piece.

14. In a fastener, the combination of a cap having a cavity provided with a conical wall surrounding the entrance thereto and a closed top which is above said entrance, with a socket member in one piece comprising a closed end or top section which is inclosed within the cavity of the cap and bears against said top part of the cap, and separate arms which extend outwardly from the said top section to bear against the inner surface of said conical wall and then inward toward each other to form a conical cavity.

WILLIAM S. RICHARDSON.

Witnesses:
F. F. RAYMOND, 2d,
J. M. DOLAN.